United States Patent
Jaynes et al.

(10) Patent No.: US 7,133,083 B2
(45) Date of Patent: Nov. 7, 2006

(54) DYNAMIC SHADOW REMOVAL FROM FRONT PROJECTION DISPLAYS

(75) Inventors: Christopher O. Jaynes, Lexington, KY (US); Stephen B. Webb, Lexington, KY (US); Robert M. Steele, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 542 days.

(21) Appl. No.: 10/315,377

(22) Filed: Dec. 9, 2002

(65) Prior Publication Data

US 2003/0128337 A1    Jul. 10, 2003

Related U.S. Application Data

(60) Provisional application No. 60/339,020, filed on Dec. 7, 2001.

(51) Int. Cl.
 *H04N 3/22* (2006.01)
(52) U.S. Cl. .................. 348/745; 348/189; 353/94
(58) Field of Classification Search ........... 348/745, 348/189, 607, 383, 36, 121; 345/1.3, 157, 345/619, 626, 624, 625; 353/69, 70, 94
See application file for complete search history.

(56) References Cited

U.S. PATENT DOCUMENTS

| | | | |
|---|---|---|---|
| 5,506,597 A | | 4/1996 | Thompson et al. ............ 345/85 |
| 5,871,266 A | | 2/1999 | Negishi et al. ................ 353/98 |
| 5,923,381 A | * | 7/1999 | Demay et al. ............... 348/592 |
| 6,115,022 A | * | 9/2000 | Mayer et al. ................ 345/418 |
| 6,310,650 B1 | * | 10/2001 | Johnson et al. ............. 348/383 |
| 6,361,438 B1 | * | 3/2002 | Morihira ...................... 463/31 |
| 6,377,269 B1 | * | 4/2002 | Kay et al. .................... 345/589 |
| 6,377,277 B1 | * | 4/2002 | Yamamoto ................... 345/629 |

(Continued)

OTHER PUBLICATIONS

Han Chen, R. Sukthankar, G. Wallace, and Tat-Jen Cham, "Calibrating Scalable Multi-Projector Displays Using Camera Homography Trees." Included here by way of background, only; noting that a corresponding citation of this group was made to [1] Technical Report TR-639-01, Princeton University, dated Sep. 2001; this document was available on-line for viewing on Dec. 4, 2001 and printed on that date. This document identified Attachment D of prov. app.

(Continued)

*Primary Examiner*—Victor R. Kostak
(74) *Attorney, Agent, or Firm*—Macheledt Bales & Heidmiller LLP (57) ABSTRACT

A technique and system for detecting a radiometric variation/artifacts of a front-projected dynamic display region under observation by at least one camera. The display is comprised of one or more images projected from one or more of a plurality of projectors; the system is preferably calibrated by using a projective relationship. A predicted image of the display region by the camera is constructed using frame-buffer information from each projector contributing to the display, which has been geometrically transformed for the camera and its relative image intensity adjusted. A detectable difference between a predicted image and the display region under observation causes corrective adjustment of the image being projected from at least one projector. The corrective adjustment may be achieved by way of pixel-wise approach (an alpha-mask is constructed from delta pixels/images), or bounding region approach (difference/bounding region is sized to include the area of the display affected by the radiometric variation). Also: a technique, or method, for detecting a radiometric variation of a display region under observation, as well as associated computer executable program code on a computer readable storage medium, therefor.

21 Claims, 6 Drawing Sheets

U.S. PATENT DOCUMENTS

| | | | |
|---|---|---|---|
| 6,456,339 B1* | 9/2002 | Surati et al. | 348/745 |
| 6,469,710 B1* | 10/2002 | Shum et al. | 345/619 |
| 6,512,507 B1* | 1/2003 | Furihata et al. | 345/157 |
| 6,554,431 B1* | 4/2003 | Binsted et al. | 353/28 |
| 6,570,623 B1* | 5/2003 | Li et al. | 348/383 |
| 6,611,241 B1* | 8/2003 | Firester et al. | 345/1.3 |
| 6,733,138 B1* | 5/2004 | Raskar | 353/94 |
| 2002/0164074 A1 | 11/2002 | Matsugu et al. | 382/173 |
| 2003/0085867 A1* | 5/2003 | Grabert | 345/156 |

OTHER PUBLICATIONS

R. Sukthankar, Tat-Jen Cham, and G. Sukthankar, "*Dynamic Shadow Elimination for Multi-Projector Displays,*" on-line Compaq Tech Report CRL Apr. 2001 document dated Jun. 2001.

C. Jaynes, S. Webb, and R. Matt Steele, "*Dynamic Shadow Removal from Front Projection Displays.*" Abstract from 12th IEEE Visualization 2001 Conference, VIS 2001, San Diego, CA, Oct. 24-26, 2001. Included here by way of background, only, as it is authored by applicants; noting that conference dates are within 1-year prior to provisional app. filing date.

R. Sukthankar, Tat-Jen Cham, and G. Sukthankar, "*Dynamic Shadow Elimination for Multi-Projector Displays.*" vol. 2, Proceedings of the IEEE Conference on Computer Vision and Pattern Recognition, CVPR, Kauai, Hawai'I, Dec. 8-14, 2001. Included here by way of background, only; noting that conference took place after provisional app. filing date granted, although document was available on-line for viewing on Dec. 4, 2001.

R. Samanta, J. Zheng, T. Funkhouser, K. Li and J. Pal Singh, "*Load Balancing for Multi-Projector Rendering Systems.*" Included here by way of background, only; noting that this document was available on-line for viewing on Dec. 4, 2001 and printed on that date from: http://citeseer.nj.nec.com/update/201288 (listed on cover page).

R. Samanta, and T. Funkhouser, "*Dynamic Algorithms for Sorting Primitives Among Screen-Space Tiles in a Parallel Rendering System.*" Included here by way of background, only; noting that this document was available on-line for viewing on Dec. 4, 2001 and printed on that date from: http://citeseer.nj.nec.com/.

\* cited by examiner

Comparison of predicted image with and without color correction to the observed image.

FIG. 6A          FIG. 6B

6A--Difference image (Pixels detected in the $\Lambda^+I$ image); and 6B--resulting alpha mask (after warping the difference image into the display projector's frame buffer) from a shadow event of person with silhouette shown.

α Mask Construction

FIG. 7A (predicted Image)

FIG. 7B (captured/observed Image)

FIG. 7C (alpha Mask after 10 iterations in projector's framebuffer)

DYNAMIC SHADOW REMOVAL FROM FRONT PROJECTION DISPLAYS

This application claims priority to two pending U.S. provisional patent applications filed on behalf of the assignee hereof: Ser. No. 60/339,020 filed on Dec. 7, 2001, and to provisional patent application Ser. No. 60/430,575 filed Dec. 3, 2002 entitled "Monitoring and Correction of Geometric Distortion in Projected Displays."

The invention disclosed herein was made with United States government support awarded by the following agency: National Science Foundation, under contract number NSF-4-62699. Accordingly, the U.S. Government has certain rights in this invention.

BACKGROUND OF THE INVENTION

Field of the Invention

In general, the present invention relates to multi-projector systems subject to shadows and other radiometric artifacts in the display environment. More-particularly, the instant invention is directed to a technique and system for detecting and minimizing or removing shadows/shadowing caused by an occlusion (such as a human figure or some object blocking one or more projected displays), reflectance variations across the display surface, inconsistencies between projectors, inter-reflections from the display surface(s) itself, changes in display color and intensity, and other radiometric inconsistencies, of a multi-projector front-projection display system. Radiometric correction takes place in the context of an adaptive, self-configuring display environment. At least one cameras and a plurality of projectors are used in concert to determine relative device positions, derive a depth map for the display surface, and cooperatively render a blended image that is correct for the user's viewing location. For each rendering pass, a head-tracker may supply an estimate of the viewer's location. This information is used to compute what each projector should display in order to produce a complete, perspectively correct view. Here, a synchronization protocol capable of supporting dozens of PC (personal computer) rendering pipelines in a projection display using standard multicast over UDP. Novel geometric warping (or mapping), based on a known display surface geometry enables projection-based display in environments where flat surfaces are unavailable, and where multiple surfaces are used (for example, two walls, ceiling and floor of a room used to create an immersive environment). In order to remove shadows and other radiometric artifacts in the display environment, the regions of pixels that are radiometrically incorrect, i.e., the delta pixels, are first discovered or in the case of a bounding region approach a bounding region is identified/sized. The delta pixels making up the delta image, are identified by comparing a predicted image with that observed by a camera(s), and then associated with corresponding projector pixels to determine how the currently rendered image should be modified. As such, according to the invention, a unique approach has been outlined by applicants as further detailed herein as well as applicants' technical manuscript labeled ATTACMENT [A]: calibration, prediction, and correction.

In front-projection systems, shadows and other radiometric variations to the display are easily created and, though transient, are extremely distracting. Shadows, regardless of position, provide a perceptual cue that removes the user from the visually immersive experience. While back-projection can be used to avoid shadows, it introduces other problems including space considerations, intensity and sharpness attenuation, and mechanical complexity. Constraining user movement to prevent shadows is not acceptable for interactive display environments that adaptively render a model based on the user's position. Requiring a user to move in order to avoid shadows forbids particular views of the model to be visualized. Here, according to the invention, using an automatically-derived relative position of cameras and projectors in the display environment and a straightforward novel color correction scheme, the system renders an expected/predicted image for each camera location. Cameras observe the displayed image, which is compared with the expected/predicted image to detect regions of difference (e.g., shadows or other radiometric variations). These regions are transformed back to associated projector frames, where corresponding pixel values are adjusted. In display regions where more than one projector contributes to the image, shadow regions may be eliminated, all as further detailed herein.

SUMMARY OF THE INVENTION

It is a primary object of this invention to provide a technique and system for detecting a radiometric variation/artifacts (e.g., shadow(s), static or dynamic ambient illumination of the immersive environment or display surface—e.g., where a new light source is turned-on, surface inter-reflection, non-uniformities due to projector and display surface variances), of a front-projected dynamic display region under observation by at least one camera. The display is comprised of one or more images projected from one or more of a plurality of projectors-the display may be composed of a series of still or moving images, a single or series of video clips, and so on, for an educational presentation, movie or game being viewed for entertainment, etc. Once the camera(s) and projector(s) are set up for operation, the system is preferably calibrated by finding homography relationships offering mappings from device to device. A predicted image of the display region by the camera is constructed using framebuffer information from each of the projectors contributing to the display. This framebuffer information is geometrically transformed for the camera and its relative image intensity (color) is adjusted to provide useful comparison information with that actually observed by the camera. A detectable difference between a predicted image and the display region under observation at a time, t, causes a corrective adjustment of the image being projected from at least one of the projectors, preferably the projector having an unobstructed view-path to the display surface. The corrective adjustment may be achieved by way of a pixel-wise approach (an alpha-mask is constructed from delta images), or a bounding region approach (difference/bounding region is sized to include the area of the display affected by the radiometric variation).

As one will appreciate, additional features included and disclosed herein provide advantages of display clarity, additional functionalities, speed, efficiency, overall system cost-reduction, allowing for more-accurate, reliable display information to be communicated to a viewer. Specific advantages of providing the new filter and associated method for producing include any expressly identified herein as well as the following, without limitation:

(a) Ease of operability—The invention provides an ability to automatically detect and make corrective adjustments to displays without operator intervention, allowing the party presenting the display full opportunity to focus on the presentation material, or in the case of fully-automated presentation/entertainment, fewer (if any) display distractions will need maintenance operator intervention.

(b) Flexibility of design and use-The technique of the invention can be tailored for use to detect and address a wide variety of radiometric variances/artifacts that may affect a display in a wide variety of front-projection display applications.

(c) Manufacturability—The unique technique and system of the invention can be tailored to current, as well as those under development or yet-to-be-developed, multi-projector-camera projection systems providing a cost-effective means by which systems can be upgraded, or sold initially as a complete package.

Briefly described, once again, the invention includes a system for detecting a radiometric variation of a front-projected display region under observation by at least one camera at a first location (see summary description above). Also characterized is a technique, or method for detecting a radiometric variation of a front-projected display region under observation by at least one camera, as well as associated computer executable program code on a computer readable storage medium, therefor.

As one will appreciate, there are many further distinguishing features of the system and technique, and associated code, of the invention. The detectable difference may comprise a first and second set of delta image pixels which are, thereafter, mapped to a framebuffer of the projector for the corrective adjustment (preferably, that projector has an unobstructed projection-path to the radiometric variation of the display). In this case, the corrective adjustment includes blending an alpha-mask constructed from the sets of delta image pixels. The geometrically transformed framebuffer information comprises pixel information for the image projected by each respective projector, that has been transformed into a frame of the camera using, preferably, a projective relationship determined by identifying a projector-to-camera homography for each projector to each camera, and a projector-to-projector homography(ies) for projectors. Once homographies have been identified, the mapping back to the framebuffer of the projector (for corrective adjustment) comprises using an inverse of the projector-to-camera homography. See FIG. 2 for reference. The adjustment of the image intensity preferably includes constructing a color transfer function, fc(x), for at least one color channel, c, to provide a mapping of the intensity of the pixel information for the image projected by a respective projector, into the frame of the camera. As explained further, the color transfer function may be of the form:

$$f_c(x) = \frac{a}{1 + e^{-a(x-b)}} + k$$

where: fc(x) represents an intensity value in the camera frame for a pixel projected from the respective projector at channel, c, and having an intensity value of x; and where a, a, b and k represent parameters obtained during a camera-projector pre-calibration phase.

In another aspect of the invention, the focus is on making the corrective adjustment using bounding regions identified to encompass the radiometric variation detected. Here, preferably each projector (may be more then one) employed in connection with making the corrective adjustment, has an unobstructed projection-path to a bounding region sized to encompass the radiometric variation of the display. The corrective adjustment, then, will include projecting (from the projector(s) with an unobstructed view-path) image information for that portion of the display within the bounding region. Here, the image information is projected for a time period after the difference is detectable; if and when the radiometric variation is removed or dissipates, preferably the bounding region is reduced in size until it is negligible in size (for example, the projector(s) employed to make the corrective adjustment, is effectively no longer projecting any image contributing to the corrective adjustment).

Further unique to the invention, is the opportunity to, while the display is active, continue observation with at least one camera (with an unobstructed view of the display region) for other additional radiometric variations while a corrective adjustment is being made (e.g., a bounding region of selected size is being projected). As can be also appreciated in FIG. 8, several corrective adjustments (whether pixel-wise or as bounding region adjustments) are possible during a presentation of the display. For example in connection with the bounding region approach, in the event a bounding region of a selected size is projected to address one radiometric variation (e.g., a shadow of an object/individual) and that variation is removed (object moves, yet is still partially in front of one or more projector casting a smaller shadow on the display), a new bounding region is sized for use in instructing the projector(s) to address the 'new' radiometric variation. Then, should that object/individual step away, new successively smaller bounding regions are sized to provide a phase-out of the image being projected employed in the corrective adjustment.

It may be preferable to dedicated one or more projectors to make the corrective adjustment: for either approach-the pixel-wise or bounding region approach. For example, a third projector positioned such that it has an unobstructed view-path to the display region, may be employed for making a bounding region corrective adjustment while two other projectors are producing the display under observation. Here, the corrective adjustment will include projecting, from the third projector, image information for that portion of the display within the bounding region for a time period after the difference is detectable. During that time period, each of the other projectors affected by the radiometric variation projects may be instructed to project no image within the bounding region.

BRIEF DESCRIPTION OF THE DRAWINGS AND ATTACHMENT A

For purposes of illustrating the innovative nature plus the flexibility of design and versatility of the preferred system and technique disclosed hereby, the invention will be better appreciated by reviewing the accompanying drawings (in which like numerals, if included, designate like parts) and applicants' ATTACHMENT A. One can appreciate the many features that distinguish the instant invention from known attempted techniques. The drawings and ATTACHMENT A have been included to communicate the features of the innovative platform structure and associated technique of the invention by way of example, only, and are in no way intended to unduly limit the disclosure hereof.

FIG. 2 is a system schematic depicting data/information flow in connection with the multi-projector system of FIG.

1 (framebuffers 1, 2, and 3 each associated with a respective projector and cameras 1 and 2).

ATTACHMENT A: Jaynes, Christopher O. and Stephen B. Webb, "*Dynamic shadow removal from front projection displays*," a technology disclosure manuscript numbered pgs. 2–18, confidentially submitted and which has remained confidential, included herewith and incorporated by reference herein to the extent it provides technical background information and support of the unique technique and system of the invention.

DETAILED DESCRIPTION OF THE EMBODIMENTS DEPICTED IN THE DRAWINGS

Figure 1:
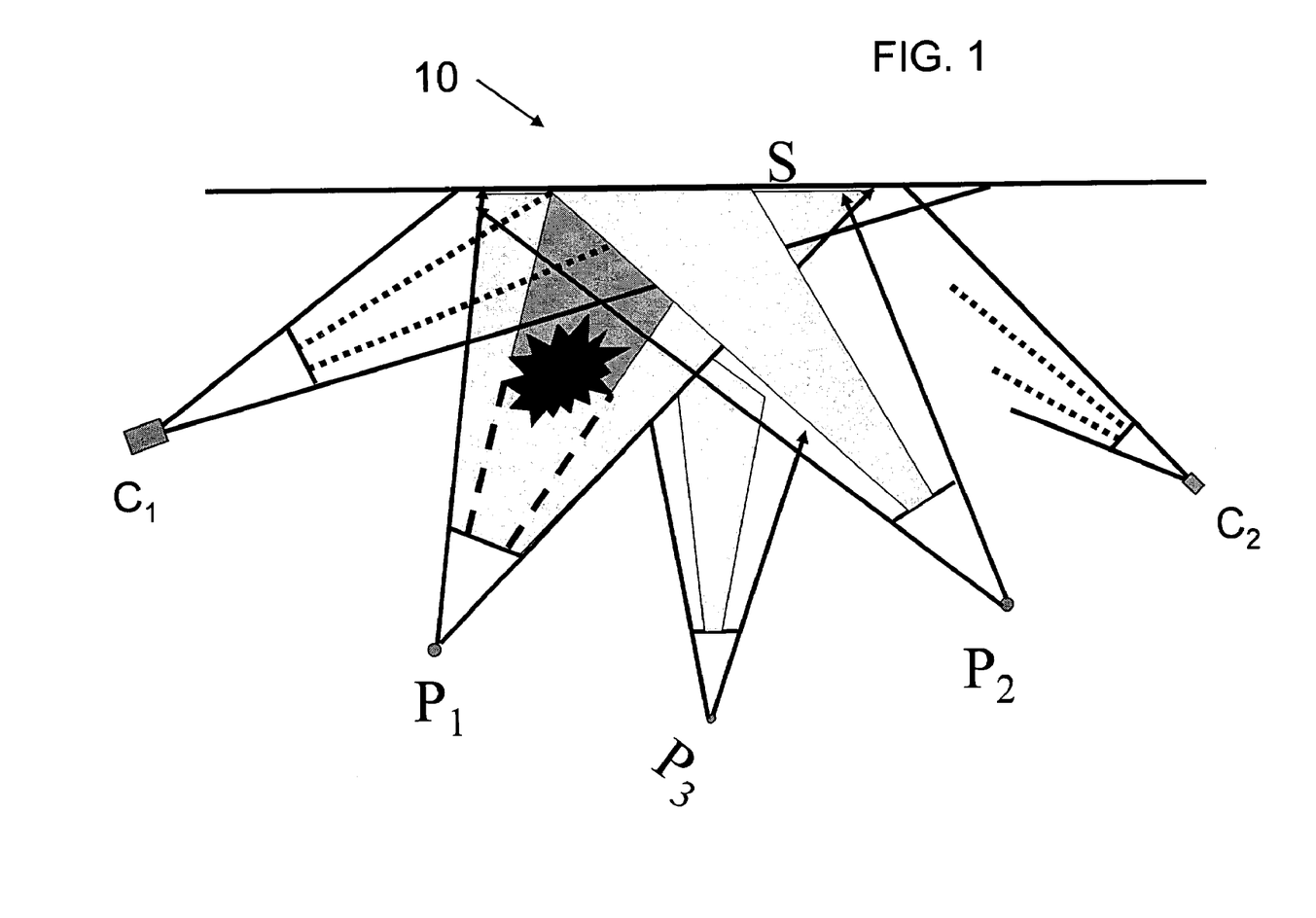
FIG. 1 schematically depicts a multi-projector system 10, having for example, projectors $P_1$, $P_2$, $P_3$ (while all are projecting to contribute to the display region of surface S, they need not be) and cameras $C_1$ and $C_2$, according to the invention.
Figure 2:
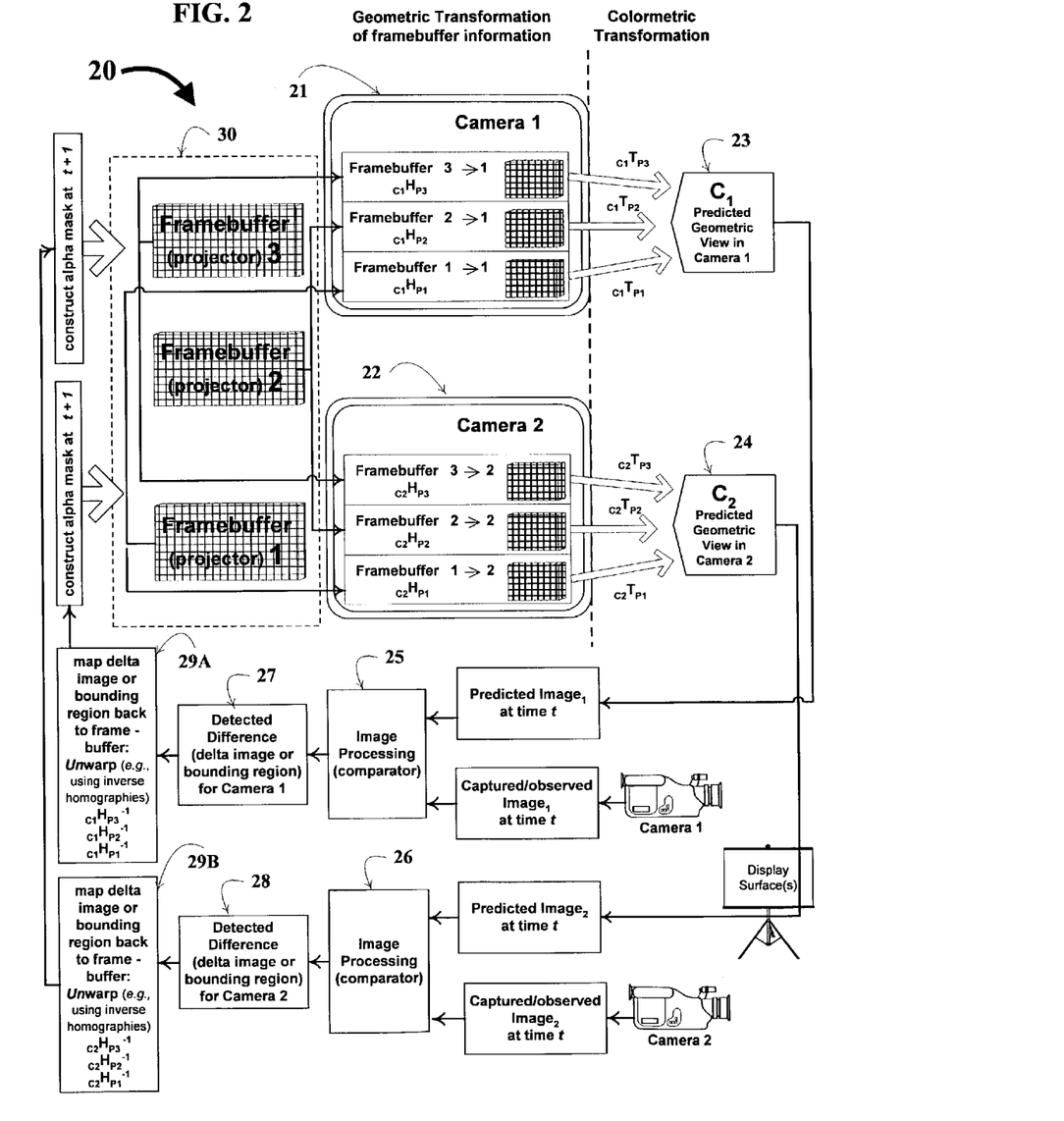
Figure 3:
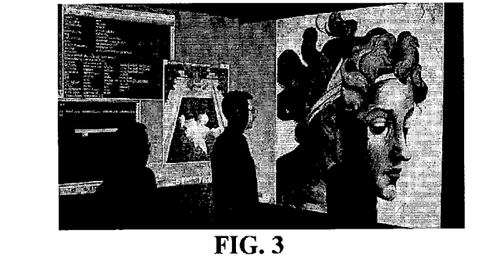
FIG. 3 is a pictorial representing a display region comprising two orthogonal display surfaces (corner of a room); the display composed of multiple images from multiple projectors (not shown) and an object/individual/occlusion causing a radiometric variation (shadow of a human) of the display on both display surfaces.
Figure 8:
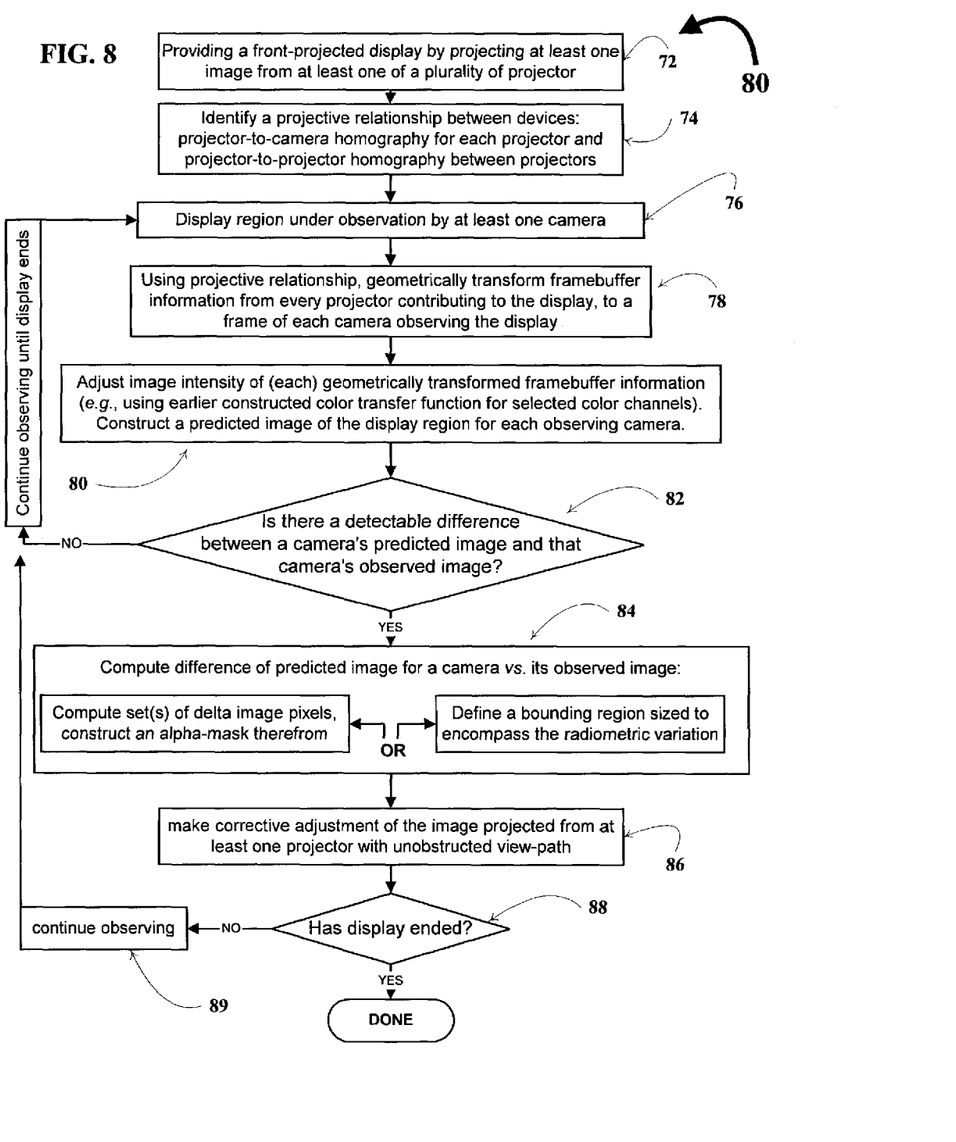
FIG. 8 is a flow diagram depicting details of a method 80 for detecting a radiometric variation of a display region under observation of at least one camera—illustrated are core, as well as further distinguishing, features of the invention for producing displays and images such as those represented and depicted in FIGS. 3, 5A–5C, 6A–6B, and 7A–7C, using features illustrated in FIGS. 1 and 2.

In connection with discussing FIGS. 1 and 2, reference will be made to FIG. 8 (detailing features of a technique of the invention 80 in flow-diagram format) as well as other figures, so that one can better appreciate the features of the system and technique of the invention. FIG. 1 schematically depicts a multi-projector system 10, having for example, projectors $P_1$, $P_2$, $P_3$ (while all are projecting to contribute to the display region of surface S, they need not be) and cameras $C_1$ and $C_2$, according to the invention. Correction of radiometric artifacts is performed for display regions that are illuminated by at least two projectors and observed by at least one camera as illustrated. Preferably, at least one camera is able to observe the screen surface at all times for which the process of detecting is engaged. For example, the placement of the cameras in the display environment might be: mounting overhead to minimize the chance of occlusion by the user. Preferably, projectors may be placed arbitrarily, without regard for the potential for occlusion, so as to maximize the usefulness of the display environment (surface area coverage or resolution).

Calibration of each device within the system engaged in producing the display is critical to detection and a resulting corrective adjustment. Initially, changes due to unexpected radiometric artifacts on the display surface are detected. Predicted imagery is constructed for a specific camera position and color transfer function and compared to captured images. Predicted images 23, 24 (FIG. 2) are constructed using the identified position of the camera with respect to each projector as well as a unique color (transfer function) calibration phase applied in a straightforward manner. The features of system 20 depicted in FIG. 2 are herein referenced in connection with a multi-projector system of the invention, such as that in FIG. 1. Given a camera (21 and 22) and projector pair, geometric calibration comprises the transformation from pixels in the camera plane (shown within box defined at 21 and box defined at 22) to their corresponding positions in the projectors' frame buffers (depicted within dashed box 30 are three framebuffers identified as 1–3). Given this transform, regions in shadow, observed in a camera, can then be correctly adjusted in the projected imagery. Once the homography between each projector and the camera has been recovered, a composition homography can be constructed to relate projector pixels to one another. Each projector projects a grid pattern that is parallel the axes of its own framebuffer. Given the known calibration, a coherent grid can be drawn by all projectors in the respective reference frame of a single projector.

While a planar assumption is not a requirement, however, it is used by way of example in the analysis done, here. Presume that the camera devices observe a plane, the calibration problem becomes a matter of finding the collineation A such that:

$$\tilde{p}_j = A p_i \qquad \text{Equation 1}$$

for all points $p_i$ in the camera and all $p_j$ in the projector. Because A is a planar projective transform (a collineation in $P^2$) it can be determined up to an unknown scale factor $\lambda$, by four pairs of matching points in general configuration. Iteratively projecting a random point from the projector onto the display surface and observing that point in the camera generates matching points. Each image point center $p_i$ is computed by fitting a 2D Gaussian to observed greyscale response whose variance is related to expected image noise. The resulting center point of the function is then stored with its matching projector pixel $p_j$. Given at least four random pairs, compute A up to an unknown scale factor $\lambda$. A may be computed using 10 matching pairs.

Alternatively, and preferably, the subpixel location of each matchpoint center in the camera frame may be estimated by fitting a 2D Gaussian function governed by two parameters {mean and variance}, with the distortion parameters being eight independent values of distorting homography. Initially, a bounding box is fit/constructed around a detectable 'blob' of pixels in the projector framebuffer whose center and size provides the initial estimate of the unknown homography matrix. For this bounding box, let's say that its top is at $p_y$+sigma, it's bottom is at $p_y$—sigma, its left edge is at $p_x$–sigma, and it's right edge is at $p_x$+sigma. Note that the projector bounding box has four corners, as does a bounding box calculated for the blob mapped to the camera. One can then list four correspondences, matchpoints, consisting of: [(upper-left corner of projector's bounding box), (upper-left corner of camera's bounding box)]; [(upper-right corner of projector's bounding box), (upper-right corner of camera's bounding box)]; and so on. These four correspondences can be used to compute a homography matrix, call it H for temporary reference, here. Next, take what the projector projected, and warp it through H to build a predicted view of what the camera should have seen. All ten parameters are then optimized so as to minimize the sum of the squared distances between the observed blob pixels and the distorted Gaussian predicted by unknown parameters. This technique has provided very good subpixel estimates, with simulated data, accurate to within ~0.25 pixels. The resulting subpixel camera coordinates is then stored with its matching projector pixel $p_j$.

Figure 9:
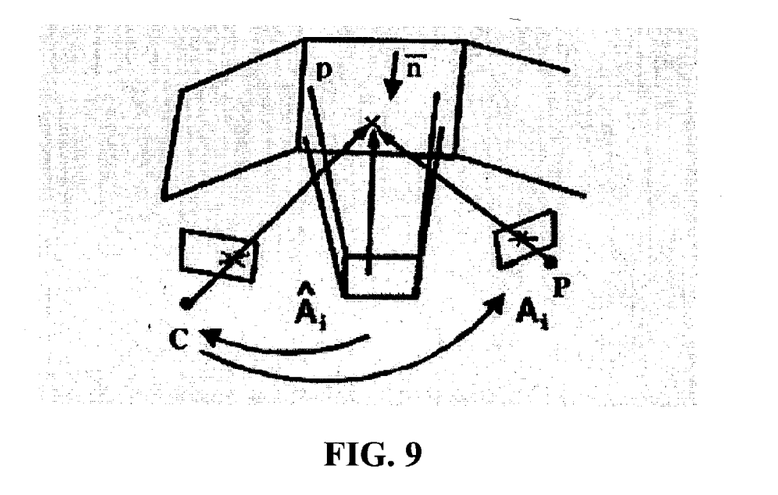
FIGS. 9 and 10 depict point and mapping references in connection with certain aspects of applicants' rigorous technical analysis.

In addition to the planar mapping between each device (camera-to-projector and projector-to-projector) in the display system, the viewer position is computed with the respect to the display surface geometry. Under the assumption that the display is piecewise planer, one can compute a viewer's position with respect to the surface as the correct planar homography between the users frame and camera. This mapping is computed at each frame in order for the camera to correctly predict the observed image based on the image currently being viewed by the user and distortion introduced by the display surface. One can construct a homography to reflect the current {frame-wise} mapping between the viewer's rendered view and that of camera i. See FIG. 9 for reference.

The accuracy of the recovered A can be measured as a pixel projection error on the projector's frame buffer for a number of matching points. Specifically, one can make calibration error estimates by illuminating the scene with a known projector pixel p, observing its corresponding position in the camera, and then computing a (sub)pixel difference:

$$\varepsilon = \sum_{i}^{N} \|p - A\hat{p}\|^2 \qquad \text{Equation 2}$$

After geometric calibration, the mapping between color values for each camera-projector pair is estimated using a color transfer function between camera and projectors, as the relationship between a projected color and the image captured by a camera pair is a complex multi-dimensional function including the projector's gamma curve, the camera's gain function, projection surface properties, and wavelength. For simplicity, the three-color channels (Red, Green, Blue) are presumed independent, and calibrated separately by approximating this complex function for each color channel. A given camera C observes the display surface, while uniform color images of increasing intensity are iteratively projected from projector P. For each projected color image, the mean color intensity is computed over the corresponding observed image. This can be computed for each color channel, holding the other two color values constant at zero. The mean value over ten trials was computed for each color channel, by way of example. The resulting color transfer functions provide a way of predicting how a color in projector space will appear in the camera image. By using this information, predicted color images can be more accurately compared with the observed images to detect areas of difference.

Figure 5A:
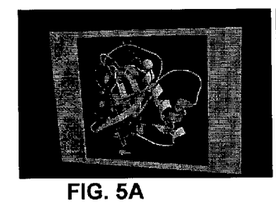
FIGS. 5A–5C are pictorials depicting, respectively: the predicted image without colormetric transformation/'correction' (FIG. 5A); an image capture/observed by camera while the display environment is in use (FIG. 5B); and predicted image of FIG. 5A after three channel transfer functions have been applied according to the invention.
Figure 5B:
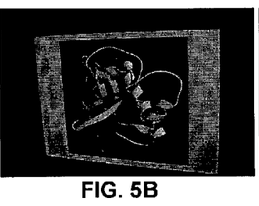
Figure 5C:
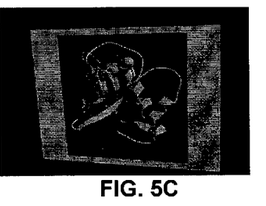

Results of the colormetric pixel intensity adjustment (box 80 FIG. 8) can be seen by way of example in the pictorials depicting, respectively: the predicted image without colormetric transformation/'correction' (FIG. 5A); an image capture/observed by camera while the display environment is in use (FIG. 5B); and predicted image of FIG. 5A after three channel transfer functions have been applied according to the invention.

Figure 4:
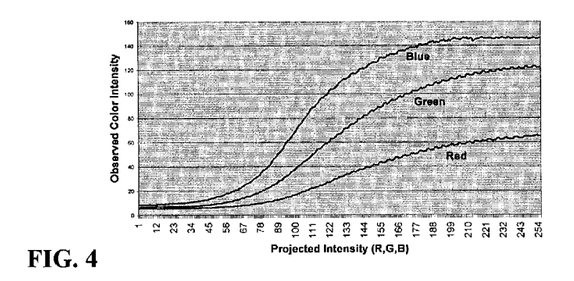
FIG. 4 graphically depicts observed color intensity vs. projected intensity for three color channels—blue, green, and red, as labeled on the curves—for a single camera-projector pair in connection with the colormetric calibration/transformation phase (FIG. 2) of constructing the predicted image for that camera.

FIG. 4 graphically depicts observed color intensity vs. projected intensity for three color channels—blue, green, and red, as labeled on the curves—for a single camera-projector pair in connection with the colormetric calibration/transformation phase (FIG. 2) of constructing the predicted image for that camera. The three transfer functions depicted in FIG. 4 were measured by the color calibration process for a single camera-projector pair (where values of particular known intensities are projected by the projector and observed by the camera). The transfer function, fc(x), Eqn. 3, computes the expected value of channel c in the camera image for a projected value of x.

$$f_c(x) = \frac{a}{1 + e^{-\alpha(x-b)}} + k \qquad \text{Equation 3}$$

Typically in data projector systems for human viewing, three color channels, {R, G, B}, corresponding to Red, Green, and Blue color components, respectively, are used. Thus, if the projector projects a pixel with a red-channel value of x, the camera sees that pixel as having a red-channel value of $f_r(X)$. Preferably, a separate color transfer function is computed for each channel independently, thus in addition to the red-channel value of $f_r(x)$ for the green and blue channels, respectively, a value for $f_g(x)$ and $f_b(x)$, is also computed. The parameters a, α, b and k used in the various channels {r, g, b} for Eqn. 3 are independent and may be different for each function. These four parameters are preferably discovered/estimated by way of a calibration phase where values of particular known intensities are projected by the projector and observed by the camera. For instance, the projector is instructed to project an image which is completely filled with pixels having RGB value of: (100, 0, 0). Once this image has been observed in the camera, the corresponding red channel value (in the camera) can be obtained. The process to project an image that is observed by the camera, is repeated for several different intensities in the red channel, spanning the dynamic range of the projector under calibration (i.e., near zero, some intermediate values, and close to 255). The process is then carried out for the blue and green channels. For example, one might project four different color values for each color channel, and observe them in the camera. As an approximation, it is presumed that the color channels are independent-that the red channel value in the camera only depends on the red channel value of the projected image, likewise, any combination of blue and green will give a zero response in the red channel of the camera. Below is an example set of values observed during calibration, whereby all three-tuples are for R, G, B color values:

Project (0, 0, 0) from the projector, observe (15, 20, 31)

Project (100, 100, 100) from the projector, observe (76, 82, 103)

Project (200, 200, 200) from the projector, observe (113, 128, 154)

Project (255, 255, 255) from the projector, observe (125, 151, 161)

Using the values from the calibration one can compute values for the parameters a, α, b and k for each of the color transfer functions; for example, in connection with the R transfer function [$f_r(x)$], the values of interest fall within the following ranges: 0→15; 100→76; 200→113; 255→125; and so on. A single transfer function can adequately model the spectral relationship between the two devices regardless of spatial position. In addition, computing global transfer functions avoids coupling the measurement of the transfer function with spatial errors produced in an earlier geometric calibration phase.

Figure 6A:
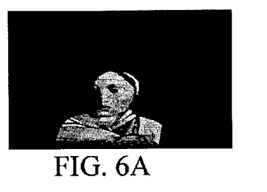
FIGS. 6A and 6B are pictorials depicting, respectively: a pixel-wise difference image (pixels detected in the $\Delta^+I$ image) from a shadow event of a human with silhouette shown; and the resulting alpha mask after warping the difference image in FIG. 6A into the display projector's framebuffer.
Figure 6B:
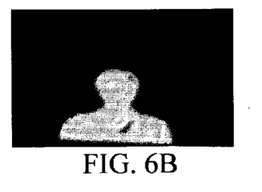

Once the display has been calibrated, a corrective adjustment automatically takes place. A filtering process produces a set of delta pixels that must be corrected in the next frame. Given a set of delta pixels, the system then determines corresponding projector pixels that are attenuated or intensified to bring the intensities of the observed image into agreement with the predicted imagery. FIGS. 6A and 6B are pictorials depicting, respectively: a pixel-wise difference image (pixels detected in the $\Delta^+I$ image) from a shadow event of a human with silhouette shown; and the resulting alpha mask after warping the difference image in FIG. 6A into the display projector's framebuffer.

A preferred alternative to this approach uses a region-based technique. Rather than perform a pixelwise computation of a new region for which pixels should be either detection of the shadowed regions (represented in the delta image), a bounding region can be fit/sized to detected shadowed regions. This bounding region can then be unwarped (step 29A, 29B in FIG. 2) to the appropriate projector framebuffers to illuminate or darken. In a complex multi-projector environment this more-compressed representation can be efficiently transmitted to each rendering device in the display. The pixelwise radiometric correction approach presented here has certain advantages: In contrast with region-based shadow removal in which rectangular regions are either completely on (alpha =1) or off (alpha =1), the pixel-wise approach operates on individual pixels and accommodates all intensity values by incrementally adjusting the alpha channel values.

Preferably, the camera is able to observe the display surface without a significant chance of occlusion by the user/viewer. For example, the camera may be mounted overhead and oriented down onto a display wall. Ideally, see FIG. 2, each camera observes as large a screen area as possible. An important aspect of the novel approach taken according to the invention, is that radiometric changes are detected directly in camera space. This removes the need for an explicit model of the occluding object. In addition, image-based change detection removes the requirement for full Euclidean calibration of the camera and the position of the occluding object does not need to be known. A predicted image is made available to each camera so that it can be compared to the currently observed camera view. In situations where the image is fixed (exploration of a high-resolution still, for example), the predicted image for each display camera can be pre-computed prior to running the shadow removal phase. Predicted imagery may also be updated according to known mouse and keyboard input for scenarios where the system does not correct for underlying surface distortions. This approach is useful if the projected imagery is a simple desktop environment, and is readily extended to interactive display environments.

In a dynamic display the imagery may change in an unpredictable way (user movement, simulations, video data, etc.). The predicted imagery must account for the changing display. This is accomplished by warping the rendered projector framebuffer to camera coordinates (through the earlier-recovered nomography). Given a desired image I, each projector in the display environment computes an appropriate framebuffer for projection in order to correctly contribute to the overall image L This can be accomplished in a manner that accounts for display surface geometry, relative projector positions, and the user's headtracked viewpoint in the display. Given the recovered collineation between the camera c and a projector p, $A_p^c$, a predicted image is recovered by warping all projector pixels into the camera frame. For a single projector, the predicted image is given by:

$$\tilde{I}=A_p^c I \qquad \text{Equation 4}$$

Because the predicted image is the basis for subsequent modification of projector frame buffer pixels in the display environment, it is important that the image is generally accurate. For example, one can super-sample the predicted image by computing the position of each pixel corner on the projector plane to recover an interpolated subpixel estimate of the pixel value at its center. That is, for a pixel a=[i j 0]T on the camera plane, compute $$b=[A_p^c]^{-1} a \pm \delta a \qquad \text{Equation 5}$$

where δa is the effective size of half a pixel in the camera. Each b is a vertex of a quadrilateral on the image plane of projector.

The correct pixel value I(ij) for the predicted image I, is estimated as a weighted average of the pixels contained within the quadrilateral, weighed by the percentage of each pixel that is contained in the back-projected region:

$$\tilde{I}(i,j) = \frac{1}{N} \sum_{k=0}^{N-1} p_k \cdot \lambda(p_k) \qquad \text{Equation 6}$$

where $p_k$ is a projector pixel contained in the quadrilateral and $\lambda(p_k)$ is a weighting factor equal to the total percentage of pixel pk contained in the quadrilateral. Finally, in the case where more than one projector contributes to a single camera pixel, the mean of all corresponding projector regions, computed using Equation 6, is stored in the predicted image.

Note that the predicted image differs by the image actually captured by the camera due to sensor nonlinearities, and properties of the projection surface. The transfer functions discovered in the color calibration phase (discussed earlier, see also Equation 3) are applied to the predicted image Ĩ to recover a color corrected, predicted image, Î, that can then be compared directly to the captured imagery. Each color component in the predicted image is adjusted according to:

$$\hat{I}(i,j,C)=f_C(\tilde{I}(x,y,C)), C=\{R,G,B\} \qquad \text{Equation 7}$$

Color corrected predicted images are compared to captured imagery by a subtraction of color components to derive two delta images, each representing pixels that are either too dark and should be intensified (the $\Delta^+I$ image) or pixels that are too bright and should be attenuated ($\Delta^-I$).

Each delta image, ΔI, is then filtered with a 3×3 median filter to remove spurious pixels that may emerge due to sensor noise. The size of the filter is directly related to the expected calibration error and expected image noise. Detected difference(s) in predicted images vs. observed images are 'unwarped' from the camera frame back into each contributing projector's frame to determine the appropriate projector pixels for adjustment (see FIG. 2 at 29A, 29B).

Figure 10:
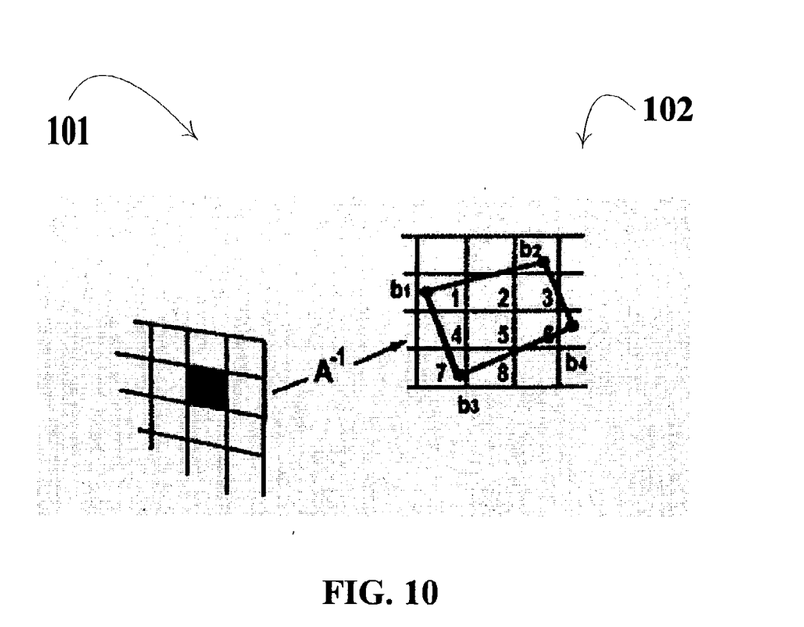

Delta images are directly related to the difference of the observed and predicted imagery for each camera in the display system. Therefore they are computed in the coordinate frame of the camera and must be projected to the reference frame of each projector for correction. This is accomplished using the earlier recovered homography between the camera and projector (used in the geometric calibration phase). In practice, camera devices and projectors are loosely coupled in the display environment through a communication mechanism such as TCP/IP, and therefore recovered delta images must be transmitted as efficiently as possible to projectors for rendering. FIG. 10 depicts how each vertex of a camera pixel (depicted at 101) is 'back-projected' (notation $A^{-1}$ in FIG. 10) to a projector's framebuffer (depicted at 102) whereby pixels overlapped by the resulting quadrilateral ($b_1$, $b_2$, $b_3$, $b_4$) contribute to a weighted value for the image pixel using the relationship guided by Equation 4–3 of ATTACHMENT A. Targeting transmission efficiency, a single delta image may be constructed from the two images identified using a representation scheme that encodes the sign of a pixel value in the high order bit of a single byte. This single image represents the alpha values that should be added to and subtracted from the current alpha mask to correct for observed differences. Due to the typical structure of a difference image, a resulting encoded image can typically be reduced from approximately 500 k bytes to less than 3 k bytes. The encoded mask is multicast to all rendering client projectors that have an overlapping field of view with the camera that has detected the radiometric variation. Each rendering client that receives a delta image, ΔI, first decodes the image and then warps the resulting alpha mask based on the relative position of the projector to the camera to recover the delta image in the projector coordinate frame, $\Delta I^P$. Because the homography between the projector and camera has been recovered in the calibration phase, this warping is implemented as:

$$\Delta I^P = [A^c_p]^{-1} \Delta I \quad \text{Equation 8}$$

Once a delta image has been aligned to a projector, an appropriate alpha mask is computed as follows:

$$\alpha^P(i,j) = \rho[\Delta^+ I^P(i,j) - \Delta^- I^P(i,j)] \quad \text{Equation 9}$$

where ρ is maximum allowed intensity change between any two frames and is used to avoid rapid fluctuations on the display surface. By way of example presented below, a ρ value of 25 may be used. Although it may seem important to change the projected imagery as quickly as possible, sensor noise may lead to over-correction for shadowed regions. Potentially, this can result in the system iteratively over- and under-correcting the shadowed region. Due to minor calibration error, this feedback may propagate the region of fluctuation on the display. The ρ parameter acts as a dampener to avoid this situation.

Figure 7A:
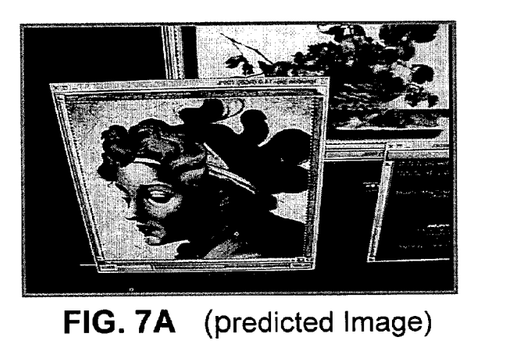
FIGS. 7A–7C are pictorials depicting, respectively: a predicted image (FIG. 7A); a captured/observed image (FIG. 7B); and the resulting alpha mask after 10 iterations in the projector's framebuffer which will be employed in the corrective adjustment (FIG. 7C).
Figure 7B:
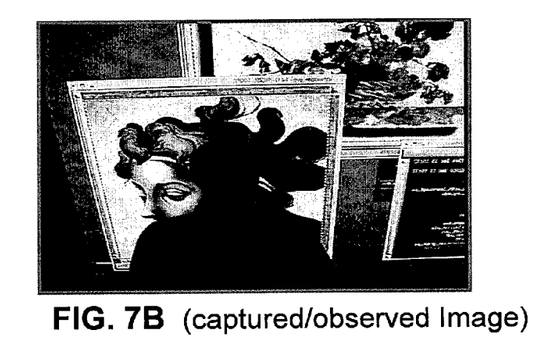
Figure 7C:
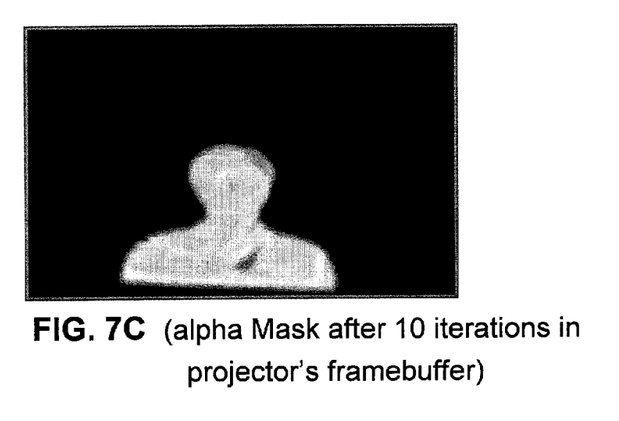

Once again, FIG. 6A is an image of a pixel-wise difference image (pixels detected in the $\Delta^+ I$ image) from a shadow event of a human with silhouette shown; and FIG. 6B is the resulting alpha mask after warping the difference image in FIG. 6A into the display projector's framebuffer. The image in FIG. 7A is of a predicted image; FIG. 7B is of a captured/observed image; and FIG. 7C is an image of the resulting alpha mask after 10 iterations in the projector's framebuffer which will be employed in the corrective adjustment.

By way of example only, the radiometric correction algorithm has been integrated with a front-projection research display environment. The display is composed of four high-resolution projectors, two infrared head-tracking units and two digital video cameras. Each projector is connected to a single PC that contains a commodity, OpenGL-compliant graphics accelerator, and a standard network interface. The cameras are connected to a single PC that contains two frame-grabbers and a network interface. The PC rendering clients are connected via a 100 Mb network hub. The display ran on the LINUX operating system. The example system was calibrated using the techniques described herein then used to demonstrate the shadow removal technique. In order to estimate the accuracy of calibration, the mean error contained in the recovered homographies between each device and all other devices was estimated. This was accomplished by selecting 10 matching pairs for all devices with a view frustum overlap. Using these matching pairs, the mean pixel error for a particular device was computed by projecting known match points from other devices to the image plane and measuring a pixel disparity. Although we do not calibrate to a Euclidean coordinate system, metric errors on the screen can be estimated by back-projecting a line of known pixel length for each device and measuring the pixel sample distance on the screen for each device. The mean pixel error can then be multiplied by this scale to arrive at an estimate for calibration error in millimeters. Error! Reference source not found reports these errors for all rendering clients in the display environment:

| Rendering Client | Mean Pixel Error | Mean Screen Error (mm) |
|---|---|---|
| Projector 1 | 0.583 | 1.23 |
| Projector 2 | 0.603 | 1.61 |
| Projector 3 | 0.616 | 1.64 |
| Projector 4 | 0.664 | 1.72 |
| Camera A | 0.782 | 1.02 |
| Camera B | 0.793 | 1.18 |

EXAMPLE 1

Summary of Process

A. Projector Calibration
   flat display: homography from display surface, S, to each projector, P (collineation)
   variable-surface display: recover surface shape (structured light) compute projection matrix B. Camera-Projector Pre-Calibration
   Compute mapping from camera to each projector: compute relative or absolute position of each projector and each camera in the system (may use relative projective relationship between devices, or an absolute projective relationship between each device and a 'world' coordinate system);

Construct a homography A (transform/mapping) of points between devices: $A_{ij}$: $p_i = A_{ij} p_j$ where $A$ as a 3×3 matrix which can be recovered from 4 (or more) corresponding pairs
For projector i and a camera j iteratively project 50 points discover corresponding pixel in camera
Compute $A_{ij}$ from 4 randomly selected match pairs
Estimate re-projection error for each random subset using k–4 correspondences:

$$\varepsilon = \sum_{0}^{k-4} \|p_i - A_{ij} p_j\|$$

select $A_{ij}$ with lowest error over many trials (preferably, where matchpoint pairs are given by (a, b) a represents a pixel in the camera image and b represents a known corresponding pixel in the projector framebuffer, A is constructed such that the difference between point a and its predicted location A×a is minimized).

C. Obtaining the Predicted Camera(s) Image
Geometric Construction/Calibration/transformation
  Render next frame
    Warp frame using $A_{ij}^{-1}$
    obtain the view of framebuffer in the camera
Colormetric Construction/Calibration/adjustment—
  Compute values for the color transfer function (below); presume channel independence
  Apply transfer function to each pixel in image; in a pre-calibration stage by projecting and observing/recording intensity with camera, determine parameters for the transfer function of the form $$f_c(x) = \frac{a}{1 + e^{-a(x-b)}} + k$$

Wait for synchronization signal
  Observe display region with each respective camera, producing observed images for comparison D. Shadow Detection
Compare captured/observed images with predicted to detect transient artifacts
  projected image need not be fixed, may be a series of still images/slides, video, etc.
  distinguish between framebuffer changes (intended) and artifacts (unintended)
Image Processing
  subtract to compute two new delta/difference images, $\Delta^+ I$ and $\Delta^- I$
    $\Delta^+ I$ and $\Delta^- I$ contain regions that are too dark and too bright respectively
  in pixelwise-approach, using a median filter (3×3), filter each delta image to remove spurious pixels, producing a set of delta pixels (in camera frame),—
  in bounding region-approach, identify/define a bounding region encompassing the area where a difference as been detected.

E. Computing α-Mask (for Pixelwise-Approach)
Each delta image (or delta bounding region) is unwarped to corresponding projector framebuffers [point-wise mapping between delta image or bounding region and associated framebuffer]
  pixelwise warp using calibration (per projector)

$$\forall P \quad \Delta^- I^P(i,j) = A_{pc} \Delta^- I(i,j)$$

$$\Delta^+ I^P(i,j) = A_{pc} \Delta^+ I(i,j)$$

bounding region-approach: (per region)
Alpha mask constructed from delta images
  blur mask with gaussian, g(x,y).
  Scale by single-frame gain, λ

$$\Delta^P(i,j) = g(x,y) * \lambda[\Delta^+ I^P(i,j) - \Delta^- I^P(i,j)]$$

F. Channel Blending Using α-Mask (Pixelwise-Approach)/Corrective Adjustment
If pixelwise approach, blending of the α-Mask constructed with alpha channels for each active projector aids in making corrective adjustment to projected image (from unobstructed projector)
If bounding region-approach make corrective adjustment.

While certain representative embodiments and details have been shown for the purpose of illustrating the invention, those skilled in the art will readily appreciate that various modifications, whether specifically or expressly identified herein, may be made to these representative embodiments without departing from the novel teachings or scope of this technical disclosure. Accordingly, all such modifications are intended to be included within the scope of the claims. Although the commonly employed preamble phrase "comprising the steps of" may be used herein in a method claim, Applicants do not intend to invoke 35 U.S.C. §112¶6. Furthermore, in any claim that is filed herewith or hereafter, any means-plus-function clauses used, or later found to be present, are intended to cover at least all structure(s) described herein as performing the recited function and not only structural equivalents but also equivalent structures.

What is claimed is:

1. A system for detecting a radiometric variation of a front-projected display region under observation by at least one camera at a first location, the system comprising:
  the front-projected display comprising at least one image projected from each of a plurality of projectors; and
  at least one processing unit for (a) constructing a predicted image of the display region by the camera using framebuffer information from each of said projectors that has been geometrically transformed for the camera using a projective relationship, and for which image intensity has been adjusted, and (b) comparing said predicted image with the display region under observation for the detecting.

2. The system of claim 1 wherein a detectable difference between said predicted image and the display region under observation causes a corrective adjustment of said image being projected from at least one of said plurality of projectors.

3. The system of claim 2 wherein said detectable difference comprises a first and second set of delta image pixels which are, thereafter, mapped to a framebuffer of said at least one projector for said corrective adjustment; said at least one projector has an unobstructed projection-path to the radiometric variation of the display; and said corrective adjustment comprises blending an alpha-mask constructed from said first and second sets of delta image pixels.

4. The system of claim 3 wherein said geometrically transformed information comprises pixel information for said image projected by a respective one of said projectors, that has been transformed into a frame of the camera using said projective relationship by identifying a projector-to-camera homography for each said projector and a projector-to-projector homography for said projectors; and said mapping to said framebuffer of said projector comprises using an inverse of said projector-to-camera homography.

5. The system of claim 2 wherein said at least one projector has an unobstructed projection-path to a bounding region sized to encompass the radiometric variation of the display; said corrective adjustment comprises projecting, from said projector with said unobstructed projection-path, image information for that portion of the display within said bounding region, said image information being projected for a time period after said difference is detectable.

6. The system of claim 1 wherein said plurality comprises a first and second projector; and further comprising a third projector having an unobstructed projection-path to a bounding region sized to encompass the radiometric variation of the display; and wherein a detectable difference between said predicted image and the display region under observation causes a corrective adjustment, said corrective adjustment to comprise projecting, from said third projector, image information for that portion of the display within said bounding region, said image information being projected for a time period after said difference is detectable; and during said time period, each of said plurality of projectors affected by the radiometric variation projects no image within said bounding region.

7. The system of claim 1 wherein said geometrically transformed information comprises pixel information for said image projected by a respective one of said projectors, that has been transformed into a frame of the camera using said projective relationship; and said adjustment of said image intensity comprises constructing a color transfer function, $f_c(x)$, for at least one color channel, c, to provide a mapping of said intensity of said pixel information for said image projected by said respective projector into said frame of the camera.

8. The system of claim 7 wherein said color transfer function is of the form:

$$f_c(x) = \frac{a}{1 + e^{-\alpha(x-b)}} + k$$

where: $f_c(x)$ represents an intensity value in said frame of the camera for a pixel projected from said respective projector at said channel, c, and having an intensity value of x; and a, $\alpha$, b and k represent parameters obtained during a camera-projector pre-calibration phase.

9. A system for detecting a radiometric variation of a front-projected display region under observation by at least one camera at a first location, the system comprising:
the display comprising at least one image projected from at least one of a plurality of projectors;
at least one processing unit for (a) constructing a predicted image of the display region by the camera using framebuffer information from said at least one projector that has been geometrically transformed for the camera, and for which image intensity has been adjusted, and (b) comparing said predicted image with the display region under observation for the detecting; and
wherein a detectable difference between said predicted image and the display region under observation causes a corrective adjustment comprising projecting image information from another of said plurality of projectors for a time period after said difference is detectable.

10. A method for detecting a radiometric variation of a front-projected display region under observation by at least one camera at a first location, the method comprising the steps of:
providing the front-projected display by projecting at least one image from each of a plurality of projectors;
constructing a predicted image of the display region using framebuffer information from each said projector, said step of constructing to comprise geometrically transforming, using a projective relationship, each said framebuffer information to the camera, and adjusting image intensity of said geometrically transformed framebuffer information; and
comparing said predicted image with the display region under observation for the detecting.

11. The method of claim 10 wherein, upon performing said step of comparing, a difference detected between said predicted image and the display region under observation causes a corrective adjustment of said image being projected from at least one of said plurality of projectors.

12. The method of claim 11 further comprising, in the event said difference is detected, the step of mapping a first and second set of delta image pixels to a framebuffer of said at least one projector for said corrective adjustment; and wherein said at least one projector has an unobstructed projection-path to the radiometric variation of the display; and said corrective adjustment comprises blending an alpha-mask constructed from said first and second sets of delta image pixels with an alpha channel of said image projected from said at least one projector.

13. The method of claim 12 further comprising the steps of identifying a projector-to-camera homography for each said projector and a projector-to-projector homography for said projectors for use in said step of geometrically transforming; and wherein:
each said framebuffer information comprises pixel information for said image projected by a respective one of said projectors;
said step of geometrically transforming further comprises using said projective relationship comprising said homographies to transform said pixel information for said image projected by said respective projector, into a frame of the camera; and
said step of mapping said first and second set of delta image pixels to said framebuffer of said projector comprises using an inverse of said projector-to-camera homography.

14. The method of claim 11 wherein said at least one projector has an unobstructed projection-path to a bounding region sized to encompass the radiometric variation of the display; said corrective adjustment comprises projecting, from said projector with said unobstructed projection-path, image information for that portion of the display within said bounding region, said image information being projected for a time period after said difference is detectable; and during said time period, each of said plurality of projectors affected by the radiometric variation projects no image within said bounding region.

15. The method of claim 10 wherein said plurality comprises a first and second projector; and further comprising a third projector having an unobstructed projection-path to a bounding region sized to encompass the radiometric variation of the display; and wherein, upon performing said step of comparing, a difference detected between said predicted image and the display region under observation causes a corrective adjustment, said corrective adjustment to comprise projecting, from said third projector, image information for that portion of the display within said bounding region, said image information being projected for a time period after said difference is detectable.

16. The method of claim 10 wherein:
   each said framebuffer information comprises pixel information for said image projected by a respective one of said projectors;
   said step of geometrically transforming further comprises using said projective relationship to transform said pixel information for said image projected by said respective projector, into a frame of the camera; and
   said step of adjusting image intensity comprises constructing a color transfer function, $f_c(x)$, for at least one color channel, c, to provide a mapping of said intensity of said pixel information for said image projected by said respective projector into said frame of the camera.

17. The system of claim 16 wherein said color transfer function is of the form:

$$f_c(x) = \frac{a}{1 + e^{-\alpha(x-b)}} + k$$

where: $f_c(x)$ represents an intensity value in said frame of the camera for a pixel projected from said respective projector at said channel, c, and having an intensity value of x; and a, $\alpha$, b and k represent parameters obtained during a camera-projector pre-calibration phase.

18. A method for detecting a radiometric variation of a front-projected display region under observation by at least one camera at a first location, the method comprising the steps of:
   providing the display by projecting at least one image from at least one of a plurality of projectors;
   constructing a predicted image of the display region using framebuffer information from said at least one projector, said step of constructing to comprise geometrically transforming said framebuffer information to the camera, and adjusting image intensity of said geometrically transformed framebuffer information; and
   upon comparing said predicted image with the display region under observation, a difference detected therebetween causes a corrective adjustment comprising projecting image information from another of said plurality of projectors for a time period after said difference is detectable.

19. A computer executable program code on a computer readable storage medium for detecting a radiometric variation of a front-projected display region under observation by at least one camera at a first location, the program code comprising:
   a first program sub-code for providing the front-projected display by projecting at least one image from each of a plurality of projectors;
   a second program sub-code for constructing a predicted image of the display region using framebuffer information from each said projector, said second sub-code comprising instructions for geometrically transforming, using a projective relationship, each said framebuffer information to the camera, and instructions for adjusting image intensity of said geometrically transformed framebuffer information; and
   a third program sub-code for comparing said predicted image with the display region under observation for the detecting.

20. The program code of claim 19 wherein: each said framebuffer information comprises pixel information for said image projected by a respective one of said projectors; and said instructions for geometrically transforming comprise instructions for using said projective relationship to transform said pixel information for said image projected by said respective projector, into a frame of the camera; and further comprising a fourth sub-code for causing a corrective adjustment of said image being projected from at least one of said plurality of projectors in the event a difference is detected between said predicted image and the display region under observation.

21. A computer executable program code on a computer readable storage medium for detecting a radiometric variation of a front-projected display region under observation by at least one camera at a first location, the program code comprising:
   a first program sub-code for providing the display by projecting at least one image from at least one of a plurality of projectors;
   second program sub-code for constructing a predicted image of the display region using framebuffer information from said at least one projector, said second sub-code comprising instructions for geometrically transforming said framebuffer information to the camera, and instructions for adjusting image intensity of said geometrically transformed framebuffer information; and
   a third program sub-code for comparing said predicted image with the display region under observation, whereupon a difference detected therebetween causes a corrective adjustment comprising projecting image information from another of said plurality of projectors for a time period during which said difference is detectable.

* * * * *